United States Patent [19]

Stein

[11] Patent Number: 5,708,830
[45] Date of Patent: Jan. 13, 1998

[54] ASYNCHRONOUS DATA COPROCESSOR UTILIZING SYSTOLIC ARRAY PROCESSORS AND AN AUXILIARY MICROPROCESSOR INTERACTING THEREWITH

[75] Inventor: Alfred Stein, Toronto, Canada

[73] Assignee: Morphometrix Inc., Toronto, Canada

[21] Appl. No.: 944,924

[22] Filed: Sep. 15, 1992

[51] Int. Cl.[6] .................................................. G06F 15/00
[52] U.S. Cl. .................... 395/800; 364/DIG. 1; 364/228.6; 395/821; 395/561
[58] Field of Search ............... 395/800, 21; 364/728.01, 364/724.12, 754, 228.6; 382/21

[56] References Cited

U.S. PATENT DOCUMENTS

| | | | |
|---|---|---|---|
| 4,885,715 | 12/1989 | McConny et al. | 364/728.01 |
| 5,138,695 | 8/1992 | Means et al. | 395/27 |
| 5,297,289 | 3/1994 | Mintzer | 395/800 |

OTHER PUBLICATIONS

Ramacher, "Synapse–X; A General–Purpose Neuro Computer Architecture", 1991 IEEE International Joint Conference on Neural Networks, Nov. 1991, pp. 2168–2176.

Morley et al., "A Massively Parallel Systolic Array Processor System", IEEE, 1988, pp. 217–225.

Owens et al., "Implementing A Family of High Performance, Micrograined Architectures", IEEE, Aug. 4–7 1992, pp. 191–205.

Electronics Design (Advertisers Edition), Oct. 31, 1984, for NCR Corporation (Contains articles referred to in pp. 1 & 2 of specification.

*Primary Examiner*—Alyssa H. Bowler
*Assistant Examiner*—Walter D. Davis, Jr.
*Attorney, Agent, or Firm*—Ridout & Maybee

[57] ABSTRACT

A coprocessor has a systolic array of processors each associated with a memory; an array data bus conveying input data to and output data from connections to the array; data buffers for the input and output data; an input and output data bus communicating with the data buffers and with a host processor; a control bus conveying successive operation codes to the array processors an instruction control store containing instructions providing operation codes for successive operations of the array processors, and a sequencer to select instructions from the control store. An intermediate data bus with a microprocessor and further random access memory communicating with that bus, carries input and output data for the array, input and output data for the microprocessor, and addresses for the memories associated with the processors of the array and for the sequencer. The control store communicates data to the intermediate bus, and the sequencer receives data from the intermediate bus, with instructions selected from the control store further providing control signals for the sequencer, the microprocessor, the intermediate bus, the further random access memory, and the input/output bus. The microprocessor generates control signals for the sequencer, and the instructions in the control store include a set of instructions for the microprocessor, so that the address sequence applied by the sequencer to the control store is modified interactively by the microprocessor responsive to instructions from the control store and data on the intermediate bus.

4 Claims, 2 Drawing Sheets

5,708,830

ASYNCHRONOUS DATA COPROCESSOR UTILIZING SYSTOLIC ARRAY PROCESSORS AND AN AUXILIARY MICROPROCESSOR INTERACTING THEREWITH

FIELD OF THE INVENTION

This invention relates to the processing of data utilizing systolic array processors.

BACKGROUND OF THE INVENTION

A practical systolic array processor system and applications for it are described in a series of articles and associated sidebars:

"Systolic Array Chip Matches the Pace of High-Speed Processing"; Davis & Thomas, Electronic Design, Oct. 31, 1984.

"Handling Real-Time Images Comes Naturally to Systolic Array Chip"; Hannaway, Shea & Bishop, Electronic Design, Nov. 15, 1984.

"Systolic Array Chip Recognizes Visual Patterns Quicker Than a Wink"; Smith & Sullivan, Electronic Design, Nov. 29, 1984.

"Associative Memory Calls on the Talents of Systolic Array Chip"; Wallis, Electronic Design, Dec. 13, 1984.

"Systolic Arrays Fill The Bill as Data-base Management Heads for Gigabyte Range"; Koster, Sondak & Sullivan, Electronic Design, Jan. 10, 1985.

These articles are primarily concerned with utilization of Geometric Arithmetic Parallel Processor (GAPP) chips developed by NCR Corp. The configuration, functions and instruction set of this chip are described and illustrated in the first of the above articles, all of which are hereby incorporated herein by reference, block diagrams of typical coprocessor systems incorporating a number of GAPP chips being illustrated in FIG. 4 of the first article and FIG. 2 of the fourth article. In these figures, instructions from a host computer are preloaded in an instruction control store in order to free the host for other tasks, instructions being forwarded to the GAPP array under control of a sequencer responsive both to control signals from the store and feedback from the array. This configuration is satisfactory for applications in which the array is being utilized for parallel processing of large quantities of data, and by reason of the feedback from the array, can respond in a limited manner to the results of the computations. However, the operations which can be carried out remain simplistic in nature, and a good deal of computational overhead is required of the host in most practical applications.

SUMMARY OF THE INVENTION

The present invention seeks to provide a coprocessor system in which the advantages of systolic array processor can be effectively utilized in the carrying out of more complex tasks without substantial dependence upon the computational power of the host and in an asynchronous manner.

The invention relates to a coprocessor of the type comprising a systolic array of processors each associated with a memory; an array data bus conveying input data to and output data from connections to said array; data buffers for said input and output data; an input and output data bus communicating with said data buffers and with a host processor; a control bus conveying successive operation codes to all of the processors of said array; an instruction control store containing instructions providing operation codes for successive operations of the processors of the array, and a sequencer to select instructions for the control store.

According to the invention, an intermediate data bus is provided, together with a microprocessor and further random access memory communicating with that bus, the intermediate bus carrying input and output data for the array, input and output data for said microprocessor, and addresses for the memories associated with the processors of the array and for the sequencer; the instruction control store communicating with the intermediate bus to apply data thereto, and the sequencer communicating with the intermediate bus to receive data therefrom; instructions selected from the instruction control store further providing control signals for the sequencer, the microprocessor, the intermediate bus, the further random access memory, and the input/output bus; and the microprocessor generating control signals for the sequencer, the instructions in the instruction control store including a set of instructions for the microprocessor, whereby the sequence of addresses applied by the sequencer to the instruction control store is modified interactively by the microprocessor responsive to instructions from the instruction control store and data appearing on the intermediate bus.

With such an arrangement, the microprocessor can perform housekeeping tasks such as maintaining loop counts during repetitive tasks, and storing variables and intermediate results in its associated memory, formed either by its own working registers or by external random access memory. This makes it possible to carry out relatively complex subroutines without intervention of the host.

Further features of the invention will become apparent from the following description of a preferred embodiment.

SHORT DESCRIPTION OF THE DRAWINGS

DESCRIPTION OF THE PREFERRED EMBODIMENT

Figure 1:
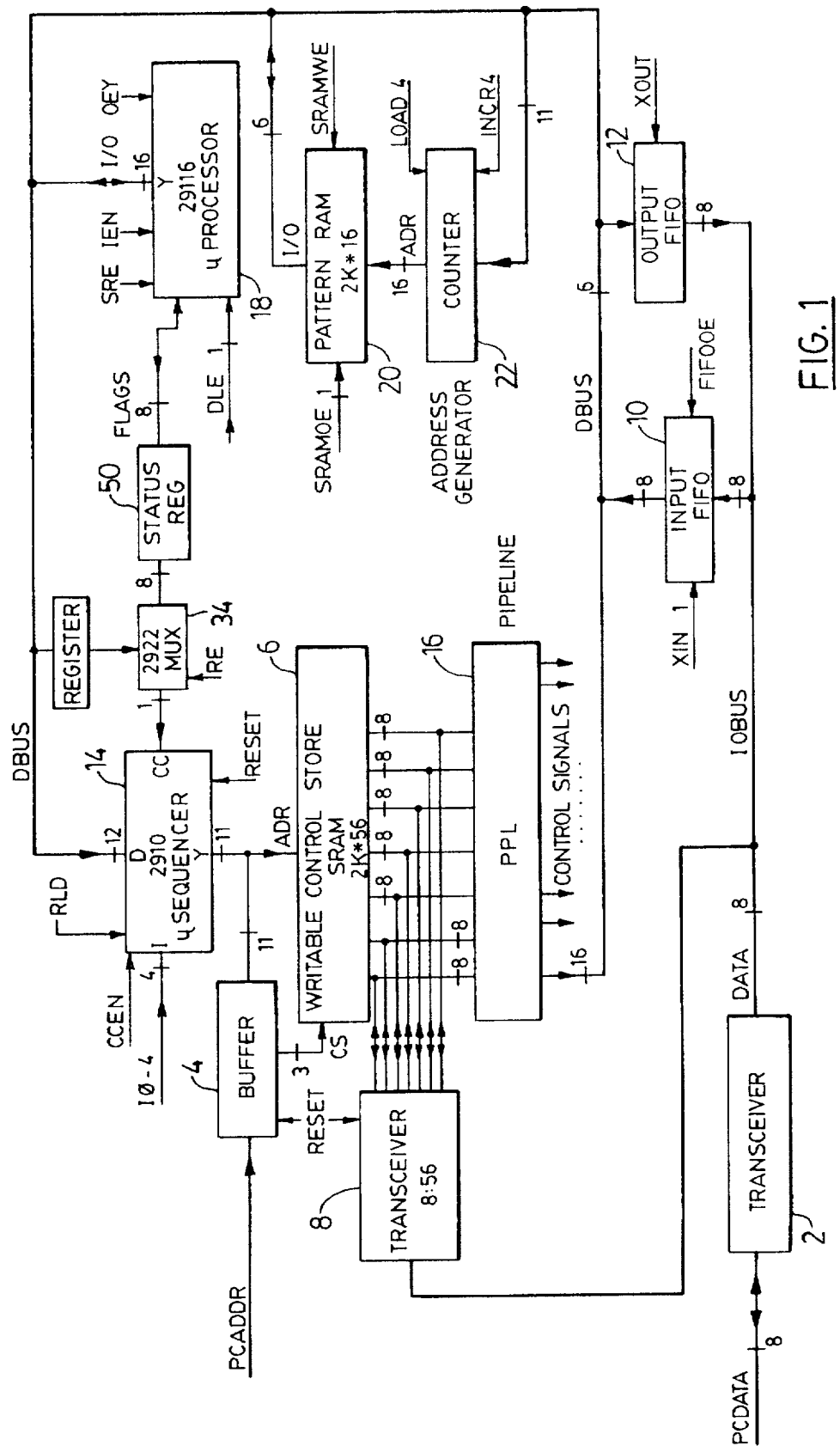
FIG. 1 is a schematic diagram of parts of a coprocessor unit incorporating the invention.

The coprocessor communicates with a host processor through address and data buses PCADDR and PCDATA respectively. It should of course be appreciated that information in this description as to bus widths, memory and array sizes is all by way of example only and not by way of limitation. The data bus PCDATA is bidirectional, and communicates through a transceiver 2 with a bidirectional input/output data bus IOBUS of the coprocessor, as shown in FIG. 1. The address bus PCADDR communicates through buffer with a writable control store 6 mapped into the memory area of the host as seven 2 Kbyte blocks of memory selected by the three most significant bits of the address bus. The data lines of the memory blocks are connected to the bus IOBUS through a transceiver set 8, which in common with the buffer 4, is normally only enabled only when the coprocessor is in a "boot" mode (see below), for loading data and instructions to or downloading data and instructions from the writable control store. Data transfer to and from the coprocessor during a run mode of the latter is handled through input and output first-in/first-out (FIFO) registers 10 and 12 connected between the bus IOBUS and an intermediate bus DBUS of the coprocessor, thus providing data buffers enabling the host processor and coprocessor to run asynchronously.

So far as internal operation of the coprocessor is concerned, the writable control store 6 operates only in read mode, addressable as 2K of 56 bit words, the seven blocks being enabled simultaneously for reading a word, identified by an eleven bit address from a sequencer 14, into a 56 bit wide pipeline latch 16. Sixteen bits of the output from the pipeline communicate with the bus DBUS, the remaining 40 bits of the output forming control signals for various components of the coprocessor as described further below.

Further components communicating with the bus DBUS are the sequencer 14 through a 12 bit data input, a multiplexer 34 through its control lines, a microprocessor 18 through a 16 bit input/output bus, a pattern random access memory (PRAM) 20 of 2k 16 bit words, a counter 22 generating addresses for the PRAM, a communication buffer 24 permitting data to be transferred, to a further bus GAPPBUS, a counter 26 generating addresses for an extended random access memory (XRAM) 28 associated with a geometric arithmetic parallel processor (GAPP) array 30, and a counter 32 generating addressing for random access memories of processors within the GAPP array 30.

Figure 2:
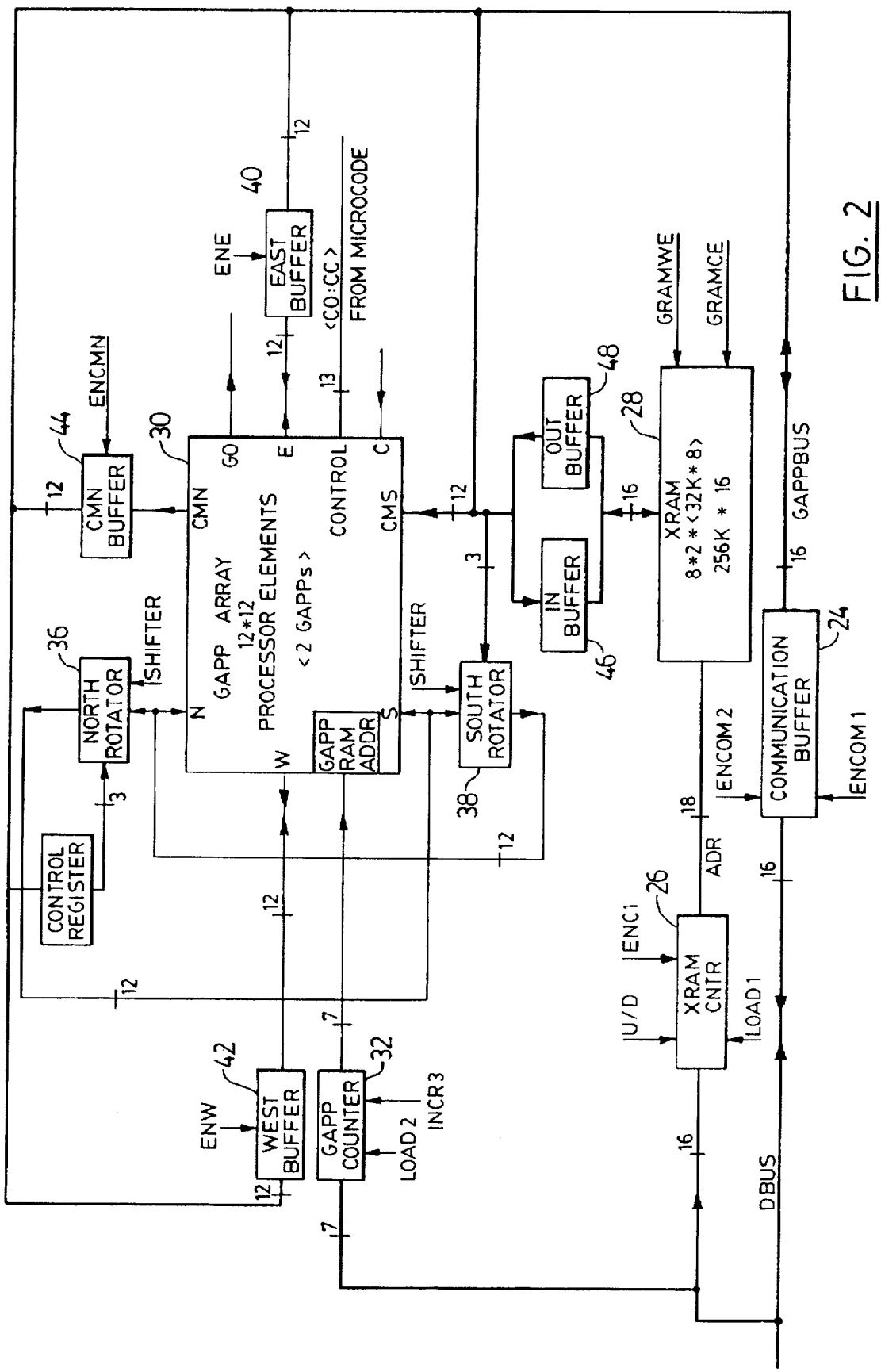
FIG. 2 is a schematic diagram of the remaining parts of the coprocessor unit of FIG. 1.

The heart of the coprocessor is the GAPP array 30, shown in FIG. 2, which in the present example consists of two GAPP devices sold by NCR Corporation and described in the articles already discussed above. The two devices are connected north to south to form a 12×12 array of single bit programs. The connections to the array are identified as in the articles. The free north (N) and south (S) connections to the array are connected through north and south rotators 36 and 38 handling signals passing in opposite directions capable on receipt of appropriate control signals from the pipeline latch of passing signals unchanged, barrel shifting, and forcing all bits of the signal to 1 or 0. The east (E) and west (W) connections to the array are connected through buffers 40 and 42 to the bus GAPPBUS, and the common north output (CMN) is connected to the bus through a buffer 44. The common south input (CMS) is also connected to this bus, as is the XRAM memory through input and output buffers 46 and 48. In the example shown, the XRAM memory is organized for convenience as 256k of 16 bit words, although the input CMS is only 12 bits wide in the example considered the necessary 18 bit addresses for these words are generated by the counter 26.

Unlike conventional GAPP applications in which instructions and addresses are directly transferred to a GAPP array, from a control store, in a sequence primarily determined by the content of the control store with only limited interaction with the array, and in which data is transferred via suitable buffering arrangements directly to and from a host bus, the present invention utilizes the intermediate D-bus to handle these transfers under the control of its own intermediate processor, and the control store contains instructions for this microprocessor as well as for the GAPP array. This permits a much higher degree of interactivity in the processing of data by the GAPP array and much more sophisticated algorithms to be performed by the coprocessor without the intervention of the host. The registers of the intermediate processor 18 and the pattern ram PRAM provide temporary storage for intermediate results as well as working memory. A suitable microprocessor for the intermediate processor is the AM29116 with 32 internal registers from American Micro Devices, which is a 16 bit processor whose internal status flags are externally accessible and latched during each microprocessor cycle into a status register 50, from which individual flags may be selected by the multiplexer 34 for application as condition codes to the sequencer 14, which may be an AM2910 microsequencer, also from American Micro Devices.

The 56 bit words from the writable control store 6 are made up and identified as follows, a—sign before a signal identification indicating that the signal is active low:

116I<0:15>/DATA<0:15>(bits 0 to 15)

The 16 bit AM29116 microprocessor instructions 116I are multiplexed with 16 bit data DATA that may be output to the bus DBUS by devices connected to that bus:

C0–CC (bits 16 to 28)

GAPP control signals.

GI (bit 29)

When GI (global input) is high a bit can be broadcast to the C register of all processors in the GAPP arrays. The broadcast bit corresponds to the state of the AM29116's zero flag, available from register 50.

-XIN (bit 30)

Shifts out a new byte from the input FIFO 10. Data does not reach the DBUS unless the FIFO's outputs are enabled (see -FIFOOE).

-SRAMOE (bit 31)

Enables the outputs of the PRAM memory.

U/D (bit 32)

This signal configures the XRAM COUNTER to count up when it is high and/or count down when it is low.

-ENC1 (bit 33)

Enables XRAM COUNTER. If this signal is active (low) the XRAM COUNTER will increment or decrement its contents depending on the state of the U/D bit. Otherwise it will hold its present address.

-GRAMCE (bit 34)

Enables the XRAM memory.

-GRAMWE (bit 35)

When -GRAMWE is low GRAMWE determines whether the XRAM memory is being written or read.

DST4, DST3, DST2, DST1 (bits 36, 37, 38, 39)

These destination bits are decoded in a 4 to 16 line demultiplexer to select one of 13 possible functions. These functions are divided into three groups:

Destination of DBUS contents

0: load XRAM COUNTER (-LOAD1)

2: load GAPP COUNTER (-LOAD3)

3: load PATTERN COUNTER (-LOAD4)

7: write data to AM29116D latch (-DLE)

8: write data to AM2910R register (-RLD)

9: shift data into output FIFO (-XOUT)

10: write data to GAPBUS (-ECOM1)

11: write data to PATTERN RAM (-SRAMWE)

12: write data to NORTH SOUTH rotator control register (-SHIFTER)

13. write data to condition code multiplexer control register (-RE)

Increment counter

5: increment GAPP COUNTER (-INCR3)

6: increment PATTERN RAM COUNTER (-INCR4)

Reset

14: reset board (-RESETSOFT)

-ENCOM2 (bit 42)

Transfer data from GAPPBUS to DBUS.

-CCEN (Bit 43)

A high on the condition code enable bit causes the microsequencer to disregard condition codes on the condition code input CC.

0,1,2,3 (bits 47,46,45,44)

A 4 bit control signal to select one of the microsequencer's 16 instructions.

-FIFOE (bit 49)

Enable the input FIFO's output lines.

-SRE (bit 50)

Enable the AM29116 microprocessor status register to be updated.

-IEN (bit 51)

Enable an AM29116 microprocessor instruction. When this signal is high 16 multiplexed data/29116 instruction bits are written to the DBUS but the AM29116 instruction input is disabled (data stored in the 29116 is preserved).

-OEY (bit 52)

Enable the AM29116 microprocessor's output lines.

-ENCMN (bit 53)

Enable the CMN BUFFER's outputs.

-ENE (bit 54)

Enable the EAST BUFFER. The direction of data transfer (to or from the GAPPBUS) is determined by the instruction given to the GAPP in the previous clock cycle (EW:=E or EW:=W).

-ENW (bit 55)

Enable the WEST BUFFER. The direction of data transfer is determined as above.

The coprocessor has two alternative modes of operation. In a boot mode, entered either by applying an external or hardware switched RESET signal to the unit, or from a run mode by issue of an instruction from the control store including bit DST 1–4 set to provide the -RESET function, the output address bus from the microsequencer 14 is disabled and the buffer 4 and transceiver 8 are enabled so that the writable control store can be addressed by the host through bus PCADDR and the contents of the control store loaded or unloaded via the bus PCDATA. Additionally, all counters and FIFOs are cleared. To terminate the boot mode and enter a run mode, the three most significant bits of the address on bus PCADDR are set high (thus selecting an address not present in the control store, which is only 7 bytes wide), and the least significant bit of bus PCDATA is also set high. This, or any suitable alternative condition, is detected by a decoder which resets the microsequencer 14 and re-enables its address output, and disables the buffer 4 and register 8. Resetting the microsequencer clears its stack and sets its program counter to zero. Subsequent communication with the host is via the input and output FIFOs 10 and 12 until the boot mode is again re-entered.

In run mode, the microsequencer 14 issues addresses to the writable control store 6 under control of a clock signal, typically at 5 MHz, the address sequence being in accordance with a control signal received by the microprocessor. The 56 bit word selected from the control store 6 by an address from the microsequencer is latched by the pipeline latch 16 for one clock cycle. This word comprises control signals and instructions for the GAPP array 3 and its associated buffers and rotators and/or for the microprocessor 18 and/or for the microsequencer 14, as detailed above, which are acted on accordingly. Operation is best illustrated by examples of routines that may be implemented utilizing the coprocessor.

EXAMPLE 1

This example, is a subroutine for calculating the average value of two 256×256 eight bit pixel images which have already been stored in the memory 28 at addresses point by pointers XIM1 and XIM2 respectively, either following previous manipulations by the GAPP array 30 or via the DBUS and GAPPBUS buses via buffer 24, in either event under control of instructions from the control store 6. A principal subroutine AVERAGE calls further subroutines XRAM-TO-GAPP, GAPP-TO-XRAM, ADD and DIV. The averaging is executed in the GAPP array 30 on successive blocks of 12×12 pixels, paged successively into the internal memories of the array processors, and the result is stored in the memory 28 at addresses pointed by XRESULT. The microprocessor 18 is utilized to maintain track of memory address pointers and loop indices, which are saved in the registers of the microprocessor. The memory pointers utilized are identified as XIM1, XIM2 and XRESULT (see above), and IM1, IM2 and IRESULT, which are pointers into portions of the internal memories associated with the processors of the GAPP array 30.

These portions are utilized for storing the eight bits of the pixels of three 12×12 blocks, respectively two input blocks and a result block. Loop indices are NO-BLOCKS, corresponding to the number of blocks remaining to be processed, i which has an initial value of 8, utilized for carrying out operations successively on eight bits of a pixel, and j having an initial value of 12, utilized for carrying out operations successively on the 12 rows of the GAPP array 30.

The statements in the code 1 correspond to instructions or groups of instructions in the writable control store; the implementations of a few examples of these statements will be considered, from which the implementation of the remainder will be apparent from the information already provided.

The DO FOR statements set up a predetermined number of loops though the following code. To this end, a loop count value corresponding to the number of iterations of the loop is loaded into a selected register the microprocessor 18. This requires an -IEN signal and two clock cycles and two instructions from the store, since the data and instruction buses of the microprocessor are multiplexed and both accessed via the bus DBUS. The final END DO statement in the loops includes bits providing a -CCEN SIGNAL, and DST 1–4 bits providing the -RE function. The condition code multiplexer has been preset to select the zero flag of the microprocessor 18 from the status register 50, and the END DO statement also contains an instruction to the microprocessor to decrement the loop count value. Thus at the end of each iteration of the loop, the condition code input CC of the microsequencer will reflect the condition of a zero flag of the microprocessor 18, and the microsequencer will be enabled by CCEN to respond by jumping to the beginning of the loop if the zero flag is not set responsive to completion of the desired number of iterations.

Considering the principal loop in the AVERAGE routine, the first instruction calls for the address of the internal RAM associated with each GAPP processor to be set by pointer IM1. To this end instructions from the control store provide an instruction to the microprocessor to place the value of IM1 from the appropriate register on the bus DBUS from the appropriate register, and an instruction LOAD3 to the GAPP counter 32 to load this address and address the GAPP RAM accordingly. Similarly, the following instruction causes the memory XRAM to be addressed using the value of pointer XIM1 stored by the microprocessor. The next instruction in the store calls the subroutine XRAM-TO-GAPP by placing the address in the store of that routine on the bus DBUS, and setting destination bits DST1–4 so as to provide signal -RLD enabling an R register in the microsequencer to be loaded with that address, following which bits I0–4 are set so as to instruct the microsequencer to push the contents of its internal program counter onto its internal stack and reset the program counter using the contents of the R register, thus transferring execution to the subroutine. The return instruction at the end of the subroutine is implemented by an instruction from the control store setting bits I0–4 so as to instruct the microsequencer to pop the original program counter setting from the stack.

Within the subroutine are two nested DO FOR loops, the outer of which provides eight iterations, one for each bit of an eight bit pixel, in a manner similar to that already described. Within this outer loop, the first instruction in the inner loop sets bits C0–CC to provide the instruction to each GAPP processor which causes it to shift the content of its CM register to the CM register of the processor to the north and reload its CM register from the processor to the south (or from the bus GAPPBUS if it is at the south edge of the array). The bit GRAMCE is set low (but not the bit GRAMWE) so as to place the contents of the selected address in the XRAM on the bus GAPPBUS, and the instruction INC XRAM ADR sets bit U/D high and bit ENC1 low so as to increment the memory XRAM address counter, so that successive iterations of the inner loop result in successive rows of the GAPP array 30 being loaded from successive addresses within the memory XRAM until the CM register of each GAPP processor is loaded.

In the outer loop, the instruction GAPP(RAM)<CM sets bits C0–CC so as to instruct the processors of the GAPP array to transfer the contents of their CM registers to the previously selected address in their internal RAM, and the following instruction sets bits C0–CC so as to instruct the processors to increment this address so that successive iterations of the outer loop load successive bits of a pixel into successive locations in the internal memory of each processor.

Returning to the main subroutine AVERAGE, the process just described is repeated using different memory locations set by the pointers IM2 and XIM2, to load a block from a second image. The further subroutines ADD, DIV and GAPP-TO-RAM are then utilized to provide the desired averaging function. It will be noted that the GAPP array carries out a succession of relatively simple parallel processing tasks suited to its capabilities, within loops and with external communications controlled by the microprocessor 18 and microsequencer 14 working together.

EXAMPLE 2

This example illustrates how processing may be shared between the GAPP array and the microprocessor 18. It takes an image stored as 8 bit pixels in the memory XRAM as a result of a GAPP array intensive operation, for example a result of the AVERAGE routine described in Example 1, and prepares and outputs to the host a pixel intensity histogram. The instructions that make up the routine provide control signals to the various components associated with the intermediate D bus, but the GAPP array is not utilized and the bus GAPPBUS is utilized only to access the memory XRAM.

These examples illustrate how the instructions from the store 6 can be utilized to control the GAPP array, or the microprocessor 18, either alternately or concurrently so as to exploit effectively the capabilities of the GAPP array in executing relatively complex tasks independently of the host.

Whilst the invention has been exemplified by reference to a systolic array of single-bit-processors, it will be understood that its principles are equally applicable to systolic arrays of multibit processors.

I claim:

1. In a coprocessor of the type comprising a systolic array of processors each associated with a memory; an array data bus conveying input data to an output data from connections to said array; data buffers for said input and output data; an input and output data bus communicating with said data buffers and providing asynchronous communication with a host processor; a control bus conveying successive operation codes to all of the processors of said array; an instruction control store containing instructions providing operation codes for successive operations of the processors of the array; and a sequencer to select instructions from the control store; the improvement wherein an intermediate data bus is provided between the data buffers and a further buffer controlling input and output of data from the array data bus, the control store together with a microprocessor and further random access memory communicating with the intermediate data bus, the intermediate data bus carrying input and output data for the array, instructions and input and outer data for said microprocessor, and addresses for the memories associated with the processors of the array and for the squencer; the instruction control store containing instructions and control signals for said microprocessor as well as for said array, and communicating with the intermediate data bus to apply data and instructions for the microprocessor thereto, and the sequencer communicating with the intermediate bus to receive data therefrom; instructions selected from the instruction control store by the sequencer comprising, in parallel with the data and instructions applied to the intermediate data bus, control signals for the sequencer, the microprocessor, the control bus, the further random access memory, and the buffers; and the microprocessor generating control signals for the sequencer, the microprocessor being controlled synchronously with the array by the control signals and microprocessor instructions from in the instruction control store whereby the sequence of instructions selected by the sequencer from the instruction control store may be modified by the processor responsive to instructions from the instruction control store and data appearing on the intermediate bus.

2. A coprocessor according to claim 1, wherein additional random access memory is accessible from the array data bus and addressable under the control of the intermediate data bus.

3. A coprocessor according to claim 1, wherein the further random access memory communicating with the intermediate data bus comprises both data registers of the microprocessor and additional external random access memory.

4. A coprocessor according to claim 1, wherein the systolic array is of single bit processors.

* * * * *